US007998374B2

(12) United States Patent
Yonemura et al.

(10) Patent No.: US 7,998,374 B2
(45) Date of Patent: Aug. 16, 2011

(54) FABRICATION METHOD OF SELF-WRITTEN OPTICAL WAVEGUIDE

(75) Inventors: Masatoshi Yonemura, Nagoya (JP); Akari Nakao, Nagoya (JP); Manabu Kagami, Nagoya (JP)

(73) Assignee: Kabushiki Kaisha Toyota Chuo Kenkyusho, Aichi-gun, Aichi-ken (JP)

( * ) Notice: Subject to any disclaimer, the term of this patent is extended or adjusted under 35 U.S.C. 154(b) by 49 days.

(21) Appl. No.: 12/311,341

(22) PCT Filed: Sep. 27, 2007

(86) PCT No.: PCT/JP2007/068850
§ 371 (c)(1),
(2), (4) Date: Mar. 27, 2009

(87) PCT Pub. No.: WO2008/038730
PCT Pub. Date: Apr. 3, 2008

(65) Prior Publication Data
US 2010/0001421 A1    Jan. 7, 2010

(30) Foreign Application Priority Data

Sep. 28, 2006   (JP) ................................ 2006-263950

(51) Int. Cl.
*B29D 11/00*   (2006.01)
(52) U.S. Cl. ..................... 264/1.25; 264/1.27; 264/1.36; 264/1.37; 264/1.38; 264/40.1
(58) Field of Classification Search .................. 264/1.25, 264/1.27, 1.36, 1.37, 1.38, 40.1
See application file for complete search history.

(56) References Cited

U.S. PATENT DOCUMENTS

| 3,914,013 | A | * | 10/1975 | Rosenberg ...................... 385/33 |
| 4,666,236 | A | * | 5/1987 | Mikami et al. .................. 385/51 |
| 2007/0002924 | A1 | * | 1/2007 | Hutchinson et al. ............ 372/98 |

FOREIGN PATENT DOCUMENTS

| JP | 53-75945 | 7/1978 |
| JP | 4-165311 | 6/1992 |
| JP | 2000-347043 | 12/2000 |

(Continued)

OTHER PUBLICATIONS

Yamashita, et al. "Waveguide shape control and loss properties of light-induced self-written (LISW) optical waveguides," J. of Lightwave Tech, vol. 20, No. 8, pp. 1556-1562, 2002.*

(Continued)

*Primary Examiner* — Richard Crispino
*Assistant Examiner* — Robert Dye
(74) *Attorney, Agent, or Firm* — McGuinn IP Law Group, PLLC

(57)   ABSTRACT

A taper angle of a self-written optical waveguide to be formed is increased or decreased at a desired position. A range of light (aperture number) condensed by a focusing lens 31 is adjusted by an iris diaphragm 22' in which the hole diameter can be changed from 1 mm to 12 mm. An image of the self-written optical waveguide 51 being fabricated is taken with a CCD camera 70, and image processing of the image is executed in real time by an image processing device 71. The taper angle of the self-written optical waveguide 51 is measured, and the taper angle of the self-written optical waveguide 51 can be desirably increased or decreased by changing the diameter of iris diaphragm 22'.

11 Claims, 19 Drawing Sheets

FOREIGN PATENT DOCUMENTS

| | | |
|---|---|---|
| JP | 2001-242353 | 9/2001 |
| JP | 2002-261385 | 9/2002 |
| JP | 2002-314122 | 10/2002 |
| JP | 2003-4990 | 1/2003 |
| JP | 2003-294968 | 10/2003 |
| JP | 2005-70189 | 3/2005 |
| JP | 2005-72737 | 3/2005 |

OTHER PUBLICATIONS

Frisken, S. J., "Light-induced optical waveguide uptapers," Opt. Lett, vol. 18, No. 13, pp. 1035-1037, 1993.*

Mimura, et al., "Optical connection using tapered self-written waveguide," Proc. of SPIE, vol. 6014, pp. 60141A-1-60141A-9, 2005.*

Yamashita, et al. "Propagation-mode-controlled fabrication of self-written waveguide in photosensitive polyimide for single-mode operation," IEEE Photonics Tech. Lett., vol. 17, No. 4, pp. 786-788, 2005.*

English Machine Translation of JP2005-070189 (of record).*

Yoshimura, et al. "Self-organizing lightwave network (SOLNET) and its application to film optical circuit substrates," IEEE Transactions on Components and Packaging Tech., vol. 24, No. 3, 2001.*

T. Yamashita "Investigation of self-written waveguides in photopolymerizing resin using multimode optical fiber irradiation", The Institute of Electronics Information and Communication Engineers, Technical Report of IEICE vol. 99, OPE 99-74 (Oct. 1990).

Form PCT/IB/338, Dated Apr. 2009.

Form PCT/IB/373, Dated Mar. 31, 2009.

English-language Translation of Form PCT/ISA/237, Dated Mar. 31, 2009.

European Search Report dated Apr. 18, 2011.

* cited by examiner

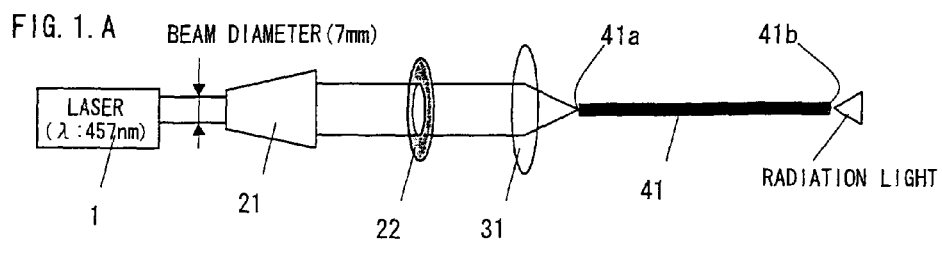
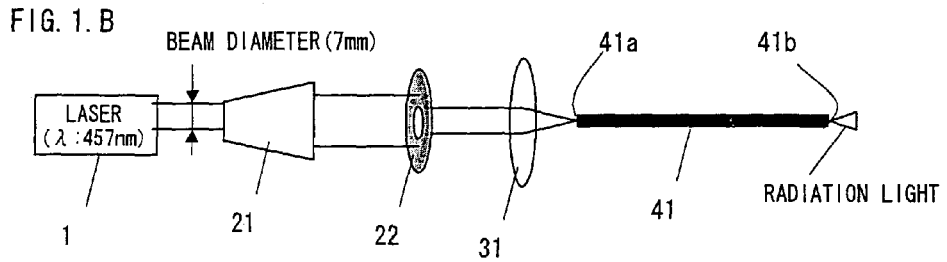

FABRICATION METHOD OF SELF-WRITTEN OPTICAL WAVEGUIDE

TECHNICAL FIELD

The present invention relates to a method of fabricating an axial self-written optical waveguide by introducing beam-like curing light into a light curing resin liquid to execute self-condensing curing of the light curing resin liquid.

BACKGROUND ART

The inventors of the present invention have proposed various fabrication methods of a self-written optical waveguide. As a self-written optical waveguide, for example, a self-written optical waveguide in which a substantially cylindrical core is formed from an optical fiber end through an upward taper (a core diameter of the self-written optical waveguide gradually increases from the optical fiber end) has been reported in academic conferences and the like.

However, there have been cases in which a core diameter is not constant and upward and downward tapers are repeatedly formed depending on selection of light curing resin or an incident mode in causing the curing light to enter into an optical fiber.

Moreover, regarding a problem that the taper of the core at a desired position of the core cannot be desirably controlled, no new technology has been reported after introduction of following documents.

[Patent Document 1]

Japanese Unexamined Patent Application Publication No. 4-165311

[Patent Document 2]

Japanese Unexamined Patent Application Publication No. 2003-4990

DISCLOSURE OF INVENTION

Problems to be Solved by the Invention

The Patent Document 1 describes that a so-called corrugation of a core diameter in which the upward taper portion and downward taper portion are repeated appears in a shape of an optical waveguide formed by irradiating beam-like curing light with a slight spread on the light curing resin. To exclude the taper portion, it is necessary to cut out an extremely short portion having a uniform diameter.

The Patent Document 2 describes that the waveguide shape is adjusted utilizing regression light of light scattered by irradiating the curing light into an optical resin from an optical fiber. In principal, fabrication of a tapered waveguide is possible. However, this technique is impractical since reflectance of resin housing portions have to be different along a longitudinal direction of the waveguide, for example.

In view of the above problems, the inventors of the present invention have found that the taper is adjustable in an upward and downward manner in fabricating a self-written optical waveguide, and have accomplished the present invention.

Means for Solving the Problems

A first aspect of the present invention is characterized in that, in a fabrication method of a self-written optical waveguide in which an optical waveguide is formed by irradiating curing light into a light curing resin liquid from an optical waveguide for introducing curing light and sequentially polymerizing the light curing resin liquid in an optical axis direction, a radiation pattern from the optical waveguide for introducing curing light into the light curing resin liquid is adjustable and a taper angle of a self-written optical waveguide to be formed is controlled in a range of from positive to negative values. Here, the radiation pattern actually refers to a light intensity distribution taken with respect to the direction of an angle formed with the optical axis in a far-field pattern. Moreover, the taper angle refers to an angle formed by the optical axis of the core and a lateral side of the core in the self-written optical waveguide. A positive taper angle refers to a case in which a core diameter increases with increasing distance from an end of the optical waveguide for introducing curing light, while a negative taper angle refers to a case in which a core diameter decreases with increasing distance from an end of the optical waveguide for introducing curing light.

A second aspect of the present invention is characterized in that as a method of adjusting the radiation pattern from the optical waveguide for introducing curing light into the light curing resin liquid, a beam diameter of the curing light introduced into a focusing lens is adjusted in a range smaller than a diameter of the focusing lens by an aperture mechanism in introducing the curing light into an incident end of the optical waveguide for introducing curing light through the focusing lens.

A third aspect of the present invention is characterized in that as a method of adjusting the radiation pattern from the optical waveguide for introducing curing light to the light curing resin liquid, the optical waveguide for introducing curing light is an optical fiber of graded index type, and a beam diameter of the curing light introduced into a core of the optical fiber is adjusted in a range smaller than the diameter of the core by an aperture mechanism.

A fourth aspect of the present invention is characterized in that as a method of adjusting the radiation pattern from the optical waveguide for introducing curing light to the light curing resin liquid, curing lights of a plurality of systems each having a smaller diameter than the diameter of a focusing lens and being introduced into the focusing lens are prepared, the curing light enters at positions with different distances from optical axis of the focusing lens, and an incident position and/or incident light intensity of the curing light introduced into the focusing lens is adjusted in introducing the curing light into an incident end of the optical waveguide for introducing curing light through the focusing lens.

A fifth aspect of the present invention is characterized in that as a method of adjusting the radiation pattern from the optical waveguide for introducing curing light to the light curing resin liquid, the optical waveguide for introducing curing light is an optical fiber of graded index type, and curing lights of a plurality of systems each having a smaller diameter than the diameter of a core of the optical fiber and being introduced into the core are prepared, the curing light enters at positions with different distances from a center axis of the core of the optical fiber, and an incident position and/or incident light intensity of the curing light introduced into the cores of the optical fiber is adjusted.

A sixth aspect of the present invention is characterized in that as a method of adjusting the radiation pattern from the optical waveguide for introducing curing light into the light curing resin liquid, an incident end of the optical waveguide for introducing curing light is adjusted on a focal point of the focusing lens or at a position on the optical axis of the focusing lens but different from the focal point in introducing the curing light into the incident end of the optical waveguide for introducing curing light through the focusing lens.

A seventh aspect of the present invention is characterized in that as a method of adjusting a radiation pattern from the optical waveguide for introducing curing light into the light curing resin liquid, an angle formed by an optical axis of the optical waveguide for introducing curing light and an optical axis of the focusing lens is adjusted in introducing the curing light into an incident end of the optical waveguide for introducing curing light through a focusing lens.

An eighth aspect of the present invention is characterized in that as a method of adjusting the radiation pattern from the optical waveguide for introducing curing light into the light curing resin liquid, a distance of a position where the curing light passes the focusing lens from an optical axis is adjusted in introducing the curing light into an incident end of the optical waveguide for introducing curing light through the focusing lens.

A ninth aspect of the present invention is characterized in that as a method of adjusting the radiation pattern from the optical waveguide for introducing curing light into the light curing resin liquid, the optical waveguide for introducing curing light is an optical fiber, and a bending radius of the optical fiber is adjusted.

A tenth aspect of the present invention is characterized in that as a method of adjusting the radiation pattern from the optical waveguide for introducing curing light to the light curing resin liquid, the optical waveguide for introducing curing light is an optical fiber, and in a portion other than an end surface of the optical fiber, cladding is eliminated, and a material having a different refractive index from the refractive index of the cladding is caused to contact a core.

An eleventh aspect of the present invention is characterized in that a taper angle of a cured portion is measured in forming the self-written optical waveguide by using an image pickup device, the radiation pattern from the optical waveguide for introducing curing light to the light curing resin liquid is adjusted according to the measured taper angle to control an increase or a decrease of the taper angle at a desired position of a self-written optical waveguide to be formed.

Controlling an increase or a decrease of the taper angle at a desired position of the self-written optical waveguide refers to increasing or decreasing the taper angle by observing a taper angle of a formed core, adjacent to a grown end of the core to control the core diameter after the grown end. Here, the taper angle decreases when an absolute value of a negative taper angle increases.

A twelfth aspect of the present invention is characterized in that a proportion of higher mode components of the radiation pattern from the optical waveguide for introducing curing light into the light curing resin liquid is decreased when the taper angle is to be decreased, and a proportion of higher mode components of the radiation pattern from the optical waveguide for introducing curing light into the light curing resin liquid is increased when the taper angle is to be increased.

Advantages

The self-written optical waveguide of the present invention is an optical waveguide obtained by increasing a refractive index of a portion polymerized by light irradiated into a light curing resin liquid in accordance with decrease of volume, enclosing irradiated light in the curing material, and forming a polymer material on the axis by radiated light from a tip of the polymerized portion. The shape of the formed polymer material depends on a pattern of irradiated light (the radiation pattern from the optical waveguide for introducing curing light). For example, in a far-field pattern (FFP) of the radiation pattern, the wider a width of the pattern becomes, the more higher mode components exist. That is, a component with a large absolute value of an angle formed by light irradiated in resin and the optical axis increases, and the diameter of a waveguide becomes wider along the length direction of the waveguide (the uptaper, the taper angle is positive). Inversely, the narrower the width of the pattern becomes, the less higher mode components exist, and the taper angle decreases (the downtaper, the taper angle is negative). The above advantages are found in the experiment by the inventors of the present invention.

On the other hand, when an optical waveguide such as an optical fiber is used to introduce the curing light, the shorter the optical fiber becomes, the more the mode distribution on a radiation end of the optical fiber is affected by the mode distribution on an incident end of the optical fiber. Consequently, by changing the mode distribution on the incident end of the optical fiber in a state that the radiation end of the optical fiber is inserted in the light curing resin liquid, the radiation pattern irradiated to the light curing resin liquid and a growing core which is a cured material is changed, so that the taper shape of the self-written optical waveguide is changed. That is, the taper angle of the self-written optical waveguide can be controlled by changing an incident mode distribution in the optical waveguide for introducing curing light. As shown below, it becomes clear that the taper angle of the self-written optical waveguide can be controlled from positive to negative values by various methods.

In the self-written optical waveguide in which the corrugation phenomenon (the diameter of the waveguide differs with respect to a position in the optical axis direction) occurs as seen in the Patent Document 1 etc., transmission loss becomes large. Further, when transmission is executed through a filter, the transparent characteristics differ depending on which is a contacting portion to the filter between a node and a loop of the corrugation, so that the stable performance cannot be obtained. Thanks to the present invention, the control of the taper angle can be executed at any portion and the corrugation is eliminated to fabricate an optical waveguide with a uniformed diameter, so that an optical loss is lowered. In particular, the present invention is effective when a light curing resin liquid constituted by monomer/oligomer having the same polymerization mechanism is used and when a light curing resin liquid constituted by monomer/oligomer having multiple polymerization mechanisms is used.

Moreover, when a light-emitting element is implemented in the fabrication of the self-written optical waveguide and the self-written optical waveguide is fabricated toward the light-emitting element, a coupling loss occurs if a positional accuracy of an end surface of the self-written optical waveguide is not sufficient. However, when an uptapered self-written optical waveguide toward the light-emitting element (the core diameter on the element side becomes larger) is fabricated, the positional accuracy of the end surface of the core is mitigated. Moreover, in considering the connection between the light-receiving element and self-written optical waveguide, the more rapid signal is received by an element, the smaller the light receiving area of the element becomes. Consequently, there is an advantage that, when the downtapered self-written optical waveguide (the core diameter on the element side becomes smaller) is fabricated with respect to a light-receiving element having a smaller light receiving area than the core diameter, a light is condensed on an acceptance surface to lower the coupling loss. Accordingly, by intentionally fabricating the tapered self-written optical waveguide, a high alignment accuracy and parts such as a lens are unnecessary, which achieves an optical waveguide device used in optical LAN and the like with a low cost and high performance.

BRIEF DESCRIPTION OF THE DRAWINGS

FIG. 1 is a configuration diagram of far-field pattern (FFP) measuring in EXAMPLE 1.

Figure 2:
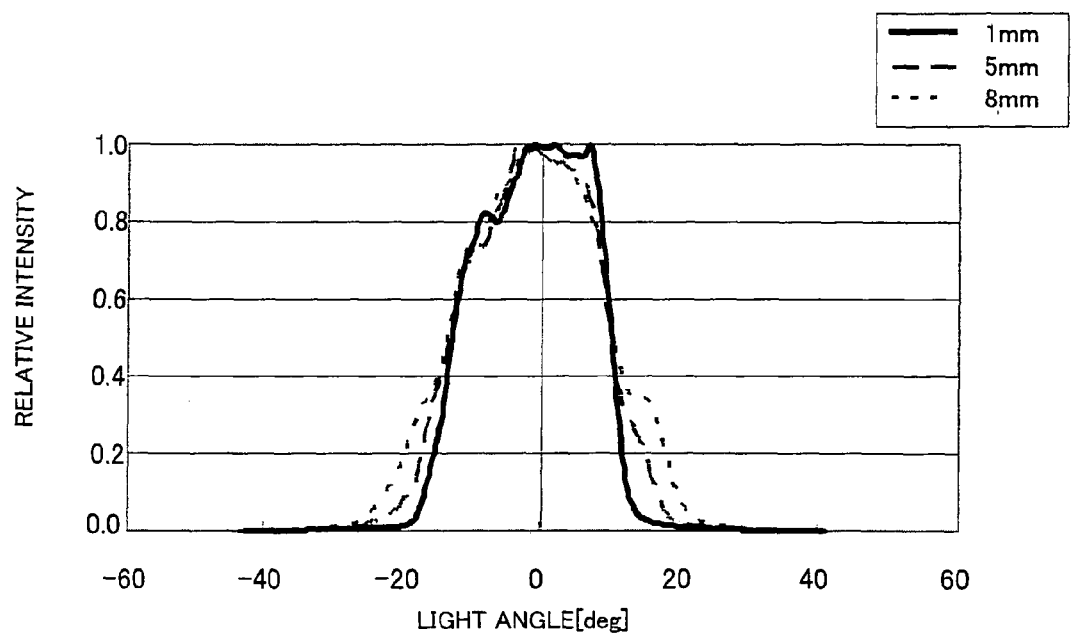
FIG. 2 is a diagram of an FFP when a pinhole diameter is changed in EXAMPLE 1.

REFERENCE NUMERALS 1 laser
21 beam expander
22 pinhole
22' iris diaphragm mask
23 mask
31, 32 focusing lenses each of which has different numeric aperture and focal distance
41 step index type optical fiber
42 quasi graded index type optical fiber
41a(42a), 41b(42b) incident end and radiation end of an optical fiber 41(42)
50 light curing resin liquid
51 self-written optical waveguide which is a cured material
60 container
70 CCD camera
71 image processing device

BEST MODES FOR CARRYING OUT THE INVENTION

As light curing resin liquid used in the present invention, any available resin liquid is applicable. As curing mechanisms, any curing mechanism is applicable including radical polymerization, cationic polymerization, and other mechanisms. Generally, a laser beam is preferable as curing light. It is better to adjust the curing speed of a light curing resin liquid by means of the wavelength and intensity of the laser. Additionally, any available light curing initiator (photopolymerization initiator) is applicable in accordance with the light curing resin liquid and the wavelength of the laser. Regarding the above components, for example, the following are listed in Japanese Unexamined Patent Application Publication No. 2004-149579 in which the applicant of the present invention is a joint applicant.

To obtain a high refractive index, a monomer/oligomer containing at least one aromatic ring such as a phenyl group in a structural unit may be preferably used. On the other hand, to obtain a low refractive index, monomer/oligomer containing only an aliphatic system in the structural unit may be preferably used. To obtain the reduction in refractive index, part of hydrogen in a structural unit may be replaced by fluorine.

As a aliphatic system, polyhydric alcohols such as ethylene glycol, diethylene glycol, triethylene glycol, tetraethylene glycol, propylene glycol, dipropylene glycol, tripropylene glycol, tetrapropylene glycol, neopentyl glycol, 1,3-propanediol, 1,4-butanediol, 1,5-pentanediol, 1,6-hexanediol, trimethylolpropane, pentaerythritol, and dipentaerythritol may be listed.

As an aromatic system, various phenol compounds such as bisphenol A, bisphenol S, bisphenol Z, bisphenol F, novolac, o-cresol novolac, p-cresol novolac, and p-alkylphenol novolac may be listed.

As a reaction group, the following functional group will be added to the above components.

[Radical Polymerization Material]

A photopolymerizable monomer and/or oligomer including one or more, preferably two or more ethylene-series unsaturated reactive group such as acryloyl group capable of radical polymerization in a structural unit. As an example of the monomer and/or oligomer including ethylene-series unsaturated reactive group, conjugate acid ester such as (meta)acrylic acid ester, itaconic acid ester, maleic acid ester may be listed.

[Cationic Polymerizable Material]

Photopolymerizable monomer and/or oligomer including one or more, preferably two or more reactive ether structures such as an oxirane ring (epoxide) capable of cationic polymerization and an oxetane ring in a structural unit. Incidentally, examples of the oxirane ring (epoxide) in the invention include an oxiranyl group, and a 3,4-epoxycyclohexyl group. Moreover, the oxetane ring is ether having a four-membered ring structure.

[Radical Polymerization Initiator]

A compound for activating a polymerization reaction of the radical polymerizable material containing a radical polymerizable monomer and/or oligomer using light is used as the radical polymerization initiator in the invention. Specific examples of the radical polymerization initiator include: benzoin compounds such as benzoin, benzoin methyl ether, and benzoin propyl ether; acetophenone compounds such as acetophenone, 2,2-dimethoxy-2-phenylacetophenone, 2,2-diethoxy-2-phenylacetophenone, 1,1-dichloroacetophenone, 1-hydroxycyclohexylphenylketone, 2-methyl-1-(4-(methylthio)phenyl)-2-morpholinopropane-1-one, and N,N-dimethylaminoacetophenone; anthraquinone compounds such as 2-methylanthraquinone, 1-chloroanthraquinone, and 2-amylanthraquinone; thioxanthone compounds such as 2,4-dimethylthioxanthone, 2,4-diethylthioxanthone, 2-chlorothioxanthone, and 2,4-diisopropylthioxanthone; ketal compounds such as acetophenone dimethylketal, and benzyl dimethylketal; benzophenone compounds such as benzophenone, methylbenzophenone, 4,4'-dichlorobenzophenone, 4,4'-bisdiethylaminobenzophenone, Michler's ketone, and 4-benzoyl-4'-methyldiphenylsulfide; and 2,4,6-trimethylbenzoyldiphenylphosphine oxide. Incidentally, a radical polymerization initiator may be used singly or two or more radical polymerization initiators may be used in combination. The radical polymerization initiator used is not limited to these specific examples.

[Cationic Polymerization Initiator]

A compound for activating a polymerization reaction of the cationic polymerizable material containing a cationic polymerizable monomer and/or oligomer using light is used as the cationic polymerization initiator in the invention. Specific examples of the cationic polymerization initiator include diazonium salt, iodonium salt, sulfonium salt, selenium salt, pyridinium salt, ferrocenium salt, phosphonium salt, thiopyrinium salt. In particular, an onium salt photo-polymerization initiator that is relatively thermally stable, such as aromatic iodonium salt or aromatic sulfonium salt, may be preferably used. Examples of the aromatic iodonium salt include diphenyliodonium, ditolyliodonium, phenyl(p-anisyl)iodonium, bis(p-t-butylphenyl)iodonium, and bis(p-chlorophenyl)iodonium. Examples of the aromatic sulfonium salt include diphenylsulfonium, ditolylsulfonium, phenyl(p-anisyl)sulfonium, bis(p-t-butylphenyl)sulfonium, and bis(p-chlorophenyl)sulfonium. When the onium salt photo-polymerization initiator such as aromatic iodonium salt or aromatic sulfonium salt is used, anions are $BF_4^-$, $AsF_6^-$, $SbF_6^-$, $PF_6^-$, $B(C_6F_5)_4^-$, etc. Incidentally, a cationic polymerization initiator may be used singly or two or more kinds of cationic polymerization initiators may be used in combination. The cationic polymerization initiator used is not limited to these specific examples.

As an optical waveguide introducing curing light, an optical fiber is preferably used. An optical system on an incident end of the optical fiber is arbitrarily designed. Moreover, an optical fiber of a graded index type may be used without the focusing lens. Additionally, the beam diameter of curing light such as a laser beam can be adjusted by a beam expander.

EXAMPLE 1

Firstly, as an example showing the change of the radiation pattern from an optical fiber (the incident mode distribution to the waveguide), a method using a pinhole is shown below.

As shown in FIG. 1.A, the beam diameter (7 mm) of light irradiated from a DPSS (diode pumped solid state) laser 1 with a wavelength of 457 nm is expanded using a beam expander 21 so that it becomes sufficiently large with respect to an effective diameter of a focusing lens 31 in the subsequent stage (the numeric aperture is 0.65 and a focal distance is 5.8 mm). A pinhole 22 is provided between the beam expander 21 and the focusing lens 31. Pinholes 22 having various diameters are prepared, and when the pinhole diameter is changed, the numeric aperture (NA) of the light passing through the focusing lens 31 changes. An incident end 41a of a plastic optical fiber 41 having a length of 0.5 m is disposed at a focal point of the focusing lens 31. As the plastic optical fiber 41, ESKA Premier of a step index type manufactured by Mitsubishi Rayon Co., Ltd. (the core diameter is 980 μm, the core refractive index is 1.49, and the numeric aperture is 0.5) is used. FIG. 1.B shows the state in which the diameter of the pinhole 22 is small (when the diameter is decreased). In this way, an FFP measuring device is disposed on a radiation end 41b of the plastic optical fiber 41, and a far-field pattern (FFP) of the radiation pattern from the radiation end 41b is measured.

Figure 3:
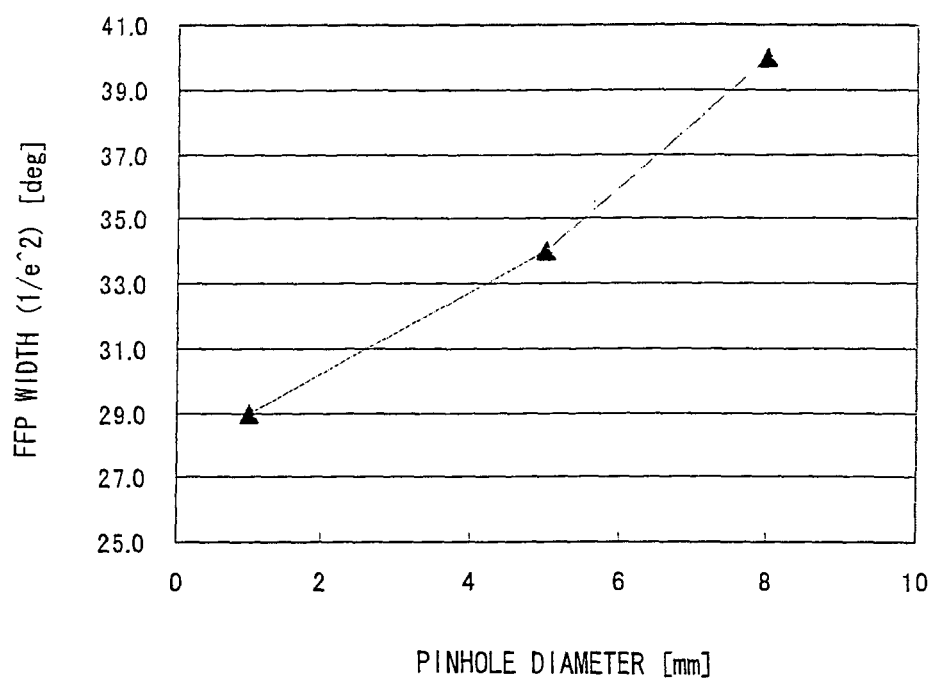
FIG. 3 is a graph showing an FFP width when the pinhole diameter is changed in EXAMPLE 1.

FIG. 2 shows far-field patterns (FFP) formed when the diameter of the pinhole 22 is 1 mm, 5 mm, and 8 mm. FIG. 3 shows a total width (the units are degrees) of a far-field pattern (FFP) having a intensity which is $1/e^2$ times larger than the peak value of the optical intensity in a far-field pattern (FFP) with respect to the diameter of pinhole 22. From this graph, it is understood that the larger the diameter of pinhole 22 becomes, the larger the width of the far-field pattern (FFP) becomes.

Figure 4:
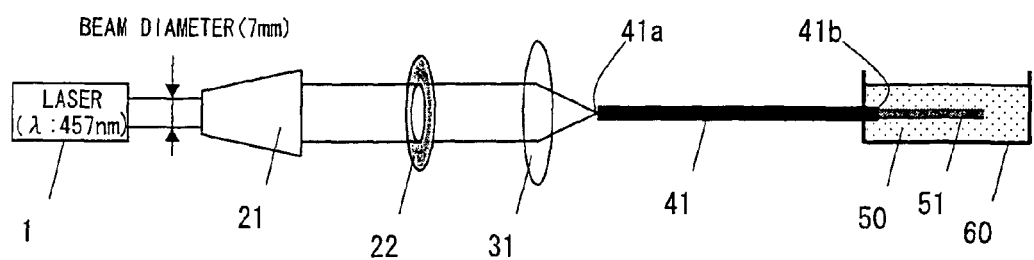
FIG. 4 is a configuration diagram of a fabrication method of a self-written optical waveguide 51 in EXAMPLE 1.

As light curing resin liquid 50, 100 parts of "Acrylic Monomers M-210" made by Toagosei Co., Ltd. and 0.5 parts of "Irgacure 819" made by Ciba Specialty Chemicals Inc. as a radicalpolymerization initiator are prepared. The M-210 is a metamorphic bisphenol A diacrylate with a refractive index before curing of 1.538 and the refractive index after curing of 1.561. These components are poured into a container 60, and as shown in FIG. 4, the radiation end 41b of the optical fiber 41 of FIG. 1 is contacted with the light curing resin liquid 50. Using an appropriate jig, the optical fiber 41 is used linearly without being bent. When a laser beam (curing light) with a wavelength of 457 nm is irradiated from the laser 1 onto the light curing resin liquid 50 through the pinhole 22, the focusing lens 31, and the optical fiber 41, a self-written optical waveguide 51 is formed. The self-written optical waveguide 51 is axial, however, the uptaper and downtaper are repeated therein. Taper angles on a portion 1 mm from the radiation end 41b of the optical fiber 41 in the self-written optical waveguide 51 when the diameter of the pinhole 22 is 1 mm, 5 mm, and 8 mm are measured by using photographs. Additionally, the laser output is adjusted so that the optical intensity of the irradiation of the light curing resin liquid 50 becomes a constant value of 3 mW irrespective of the pinhole diameter.

Figure 5:
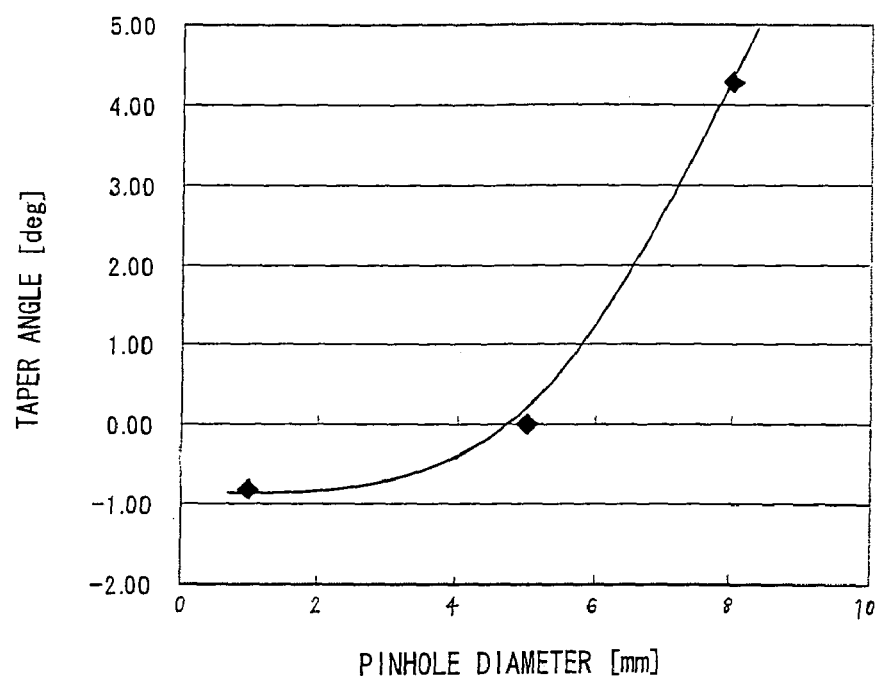
FIG. 5 is a graph showing a taper angle when the pinhole diameter is changed in EXAMPLE 1.

FIG. 5 shows a taper result. When the taper angle of the self-written optical waveguide 51 is a positive value, "uptaper" in which the optical waveguide diameter becomes larger in the irradiation direction of the curing light is shown. On the other hand, when the taper angle of the self-written optical waveguide 51 is a negative value, "downtaper" in which the optical waveguide diameter becomes smaller in the irradiation direction of the curing light is shown. From the result of FIG. 5, in a portion 1 mm from the radiation end 41b of the optical fiber 41 in the self-written optical waveguide 51 (a growth initiation point of the self-written optical waveguide 51), the uptaper is shown when the diameter of the pinhole 22 is 8 mm, the taper 0 (the diameter does not change and formed to be cylindrical) is shown when the diameter of the pinhole 22 is 5 mm, and the downtaper is shown when the diameter of the pinhole 22 is 1 mm. That is, by adjusting the diameter of pinhole 22, the taper angle of the self-written optical waveguide 51 can be adjusted from the downtaper to the uptaper.

From the above results, it is understood that a formed taper angle of the self-written optical waveguide 51 can be adjusted from positive to negative values by controlling the radiation pattern in the radiation end of the optical fiber 41 (the incident mode distribution input to the light curing resin liquid). This is because the wider the mode distribution width becomes, the more higher mode components exist, and curing in the broadening direction of the optical waveguide shape becomes easier.

VARIANT OF EXAMPLE 1

When an optical fiber of a graded index (GI) type is used, its refractive index distribution achieves the same effect as a lens. Consequently, when the diameter of a beam entering in an incident end of the GI type optical fiber is changed, the same effect can be obtained without using the focusing lens 31.

Hereinafter, other embodiments are shown sequentially. Here, the same laser 1 and the same light curing resin liquid 50 are used, and the intensity of the light irradiated onto the light curing resin liquid 50 is a constant value of 3 mE. Moreover, except EXAMPLE 7, the optical fiber 41 used in EXAMPLE 1 is used. Moreover, as a focusing lens, any of two lenses 31 and 32 having a different numeric aperture and focal distance is used.

EXAMPLE 2

Figure 6:
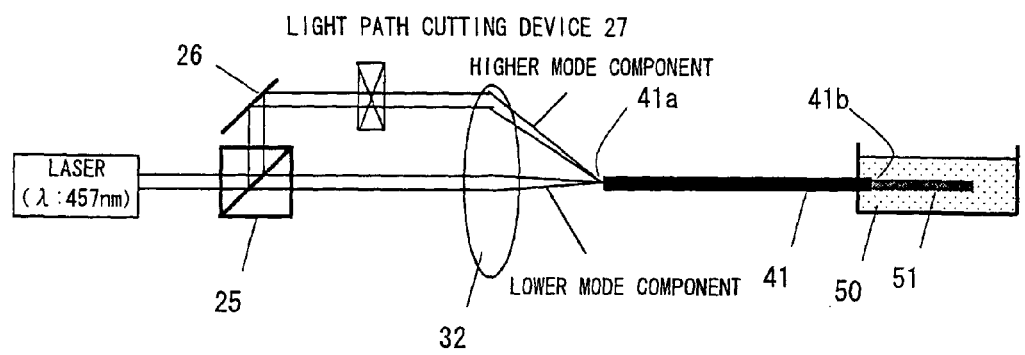
FIG. 6 is a configuration diagram of a fabrication method of the self-written optical waveguide 51 in EXAMPLE 2.
Figure 7:
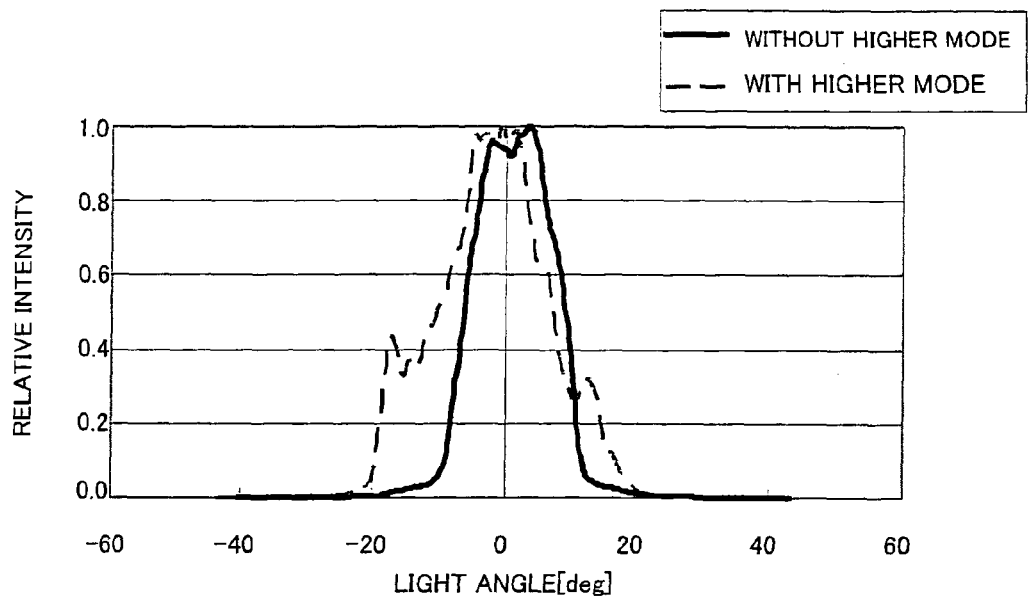
FIG. 7 is a diagram of an FFP with a higher mode component or without the higher mode component in EXAMPLE 2.

As shown in FIG. 6, light emitted from the laser 1 is divided into two light systems by a half mirror 25, and one light system enters a portion adjacent to the center of the focusing lens 32 along the optical axis, and the other light system enters a portion 20 mm from the center of the focusing lens 32 through the mirror 26 and a light path cutting device 27. By doing this, a lower mode component enters the optical fiber 41 from a portion adjacent to the center of the focusing lens 32 and a higher mode component enters the optical fiber 41 from a portion adjacent to the periphery of the focusing lens 32. At this time, on the side of the higher mode component, the self-written optical waveguide 51 is respectively formed in a case that the higher mode component is allowed to pass and in a case that the higher mode component is cut by the light path cutting device 27, and a taper angle of the self-written optical waveguide 51 at a portion 1 mm from the radiation end 41b of the optical fiber 41 is measured. Additionally, the focusing lens 32 having a numeric aperture of 0.29 and a focal distance of 81 mm is used. Moreover, FIG. 7 shows an FFP of the radiation end 41b of the optical fiber 41 in a state that it is not irradiating the light curing resin liquid 50.

When the higher mode is cut to allow the output to be 3 mW, the taper angle is −4.2 degrees, that is, the downtaper is shown. On the other hand, when the higher mode is added to allow the output to be 3 mW, the taper angle is 0.9 degrees, that is, the uptaper is shown. The formed taper angle of self-written optical waveguide 51 can be adjusted from positive to negative values.

VARIANT OF EXAMPLE 2

When an optical fiber of GI type is used, its refractive index distribution achieves the same effect as a lens. Consequently, when two light systems whose beam diameters are smaller than the core diameter enter an incident end of the GI type optical fiber similarly to the above, the same effect can be obtained.

The formed taper angle of the self-written optical waveguide 51 can be adjusted from positive to negative values.

EXAMPLE 3

Figure 8:
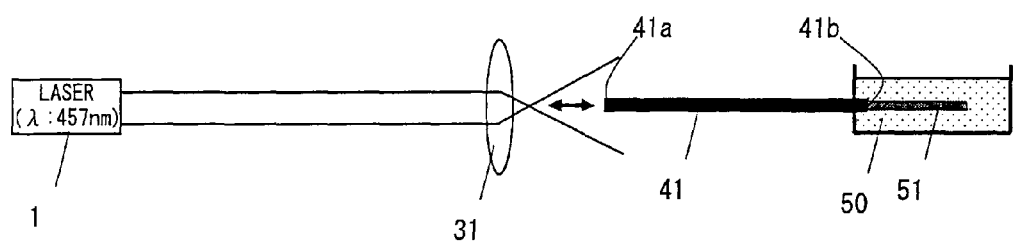
FIG. 8 is a configuration diagram of a fabrication method of the self-written optical waveguide 51 in EXAMPLE 3.
Figure 9:
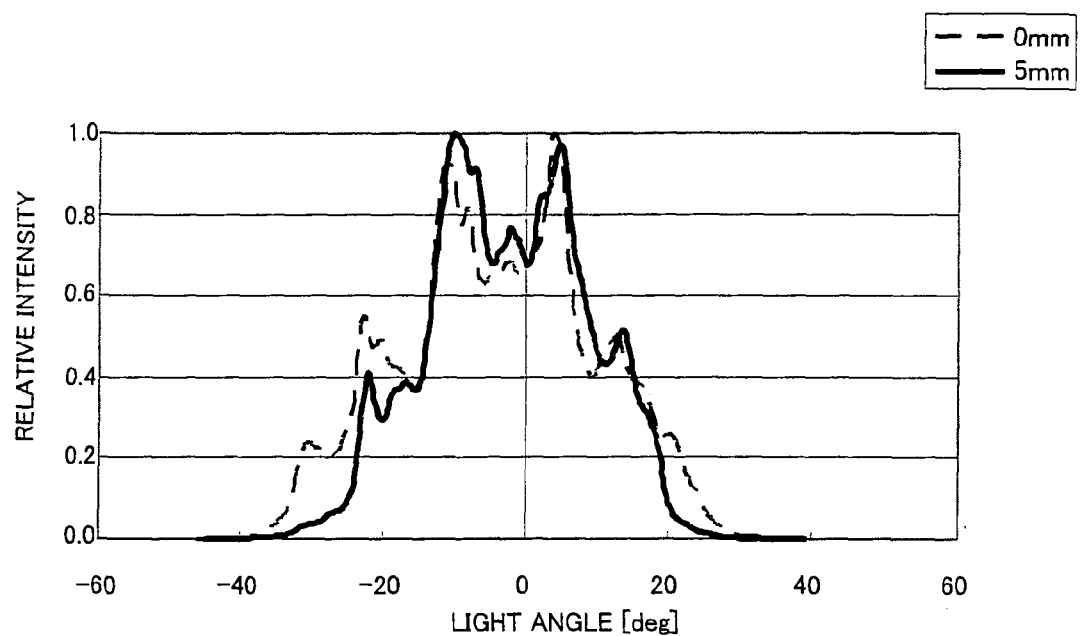
FIG. 9 is a diagram of an FFP by the distance from a focal point of an incident end 41a in EXAMPLE 3.

As shown in FIG. 8, curing light with the diameter of 7 mm projected from the laser 1 is guided to the focusing lens 31 (numeric aperture: 0.65, focal distance: 5.8 mm), and the incident end 41a of the optical fiber 41 is disposed at the focal position (position of 0 mm) or a position 5 mm therefrom on the optical axis. The self-written optical waveguide 51 is formed in both cases, and the taper angle of the self-written optical waveguide 51 at a portion 1 mm from the radiation end 41b of the optical fiber 41 is measured. Moreover, FIG. 9 shows an FFP of the radiation end 41b of the optical fiber 41 in a state that it is not irradiating the light curing resin liquid 50.

When the incident end 41a is disposed at the focal position of the focusing lens 31, the taper angle is 13.0 degrees, that is, the uptaper is shown. On the other hand, when the incident end 41a is disposed at a position 5 mm from the focal position of the focusing lens 31, the taper angle is 6.6 degrees, that is, the uptaper is shown. However, in this case, the taper angle becomes smaller. When the focusing lens 31 having a large diameter is used and the incident end 41a goes farther from the focal position of the focusing lens 31, the taper angle of self-written optical waveguide 51 can be adjusted to 0 or a negative value.

The formed taper angle of self-written optical waveguide 51 can be adjusted from positive to negative values.

EXAMPLE 4

Figure 10:
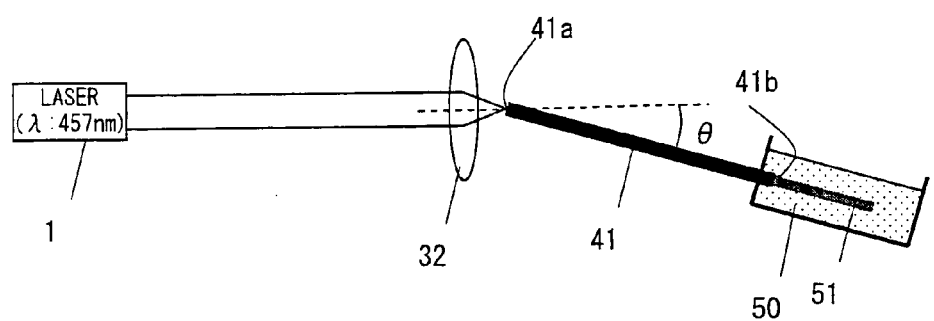
FIG. 10 is a configuration diagram of a fabrication method of the self-written optical waveguide 51 in EXAMPLE 4.
Figure 11:
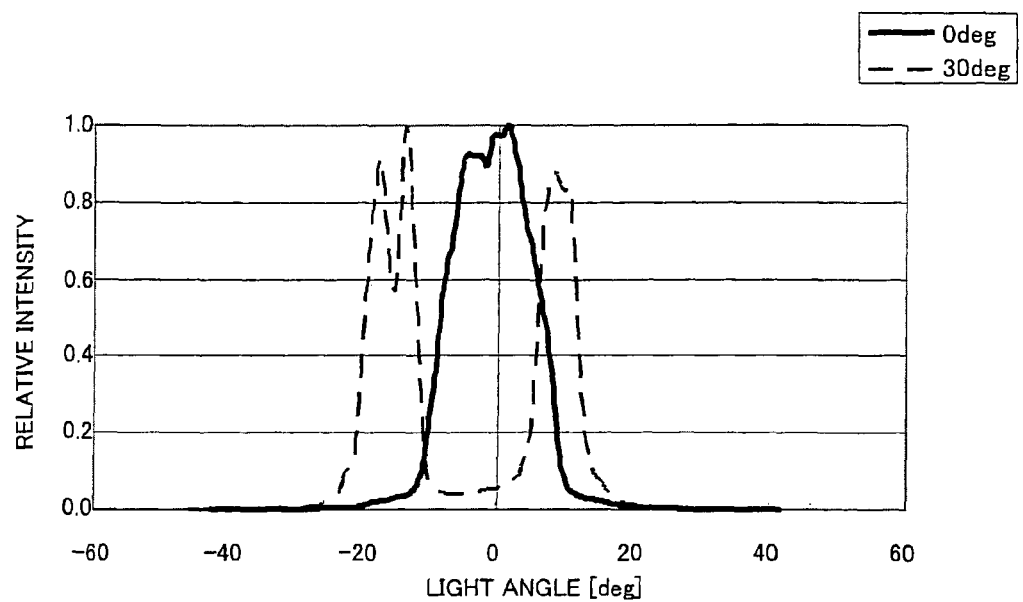
FIG. 11 is a diagram of an FFP by an angle θ formed by the optical axis of a laser 1 and the optical axis of an optical fiber 41 in EXAMPLE 4.

As shown in FIG. 10, the optical fiber 41 is disposed to form an angle of θ with respect to the optical axis of curing light with the diameter of 7 mm irradiated from the laser 1. The incident end 41a is disposed on a focal point of a focusing lens 32 (the numeric aperture: 0.29, the focal distance: 81 mm). The self-written optical waveguide 51 is respectively formed in a state that θ is 0 degree or 30 degrees, the taper angle of the self-written optical waveguide 51 at a portion 1 mm from the radiation end 41b of the optical fiber 41 is measured. Moreover, FIG. 11 shows an FFP of the radiation end 41b of the optical fiber 41 in a state that it is not irradiating the light curing resin liquid 50.

When the optical axis of the laser 1 and the focusing lens 32 corresponds to the optical axis of the optical fiber 41 (θ=0), the taper angle is −4.2 degrees, that is, the downtaper is shown. On the other hand, when the optical axis of the laser 1 and the focusing lens 32 forms an angle of 30 degrees with respect to the optical axis of the optical fiber 41, the taper angle is 3.5 degrees, that is, the uptaper is shown.

The formed taper angle of the self-written optical waveguide 51 can be adjusted from positive to negative values.

EXAMPLE 5

Figure 12:
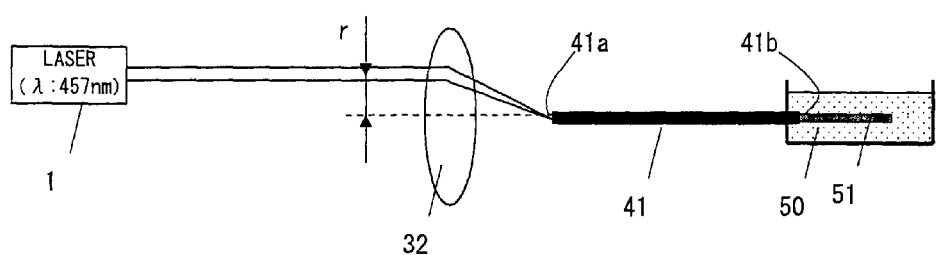
FIG. 12 is a configuration diagram of a fabrication method of the self-written optical waveguide 51 in EXAMPLE 5.
Figure 13:
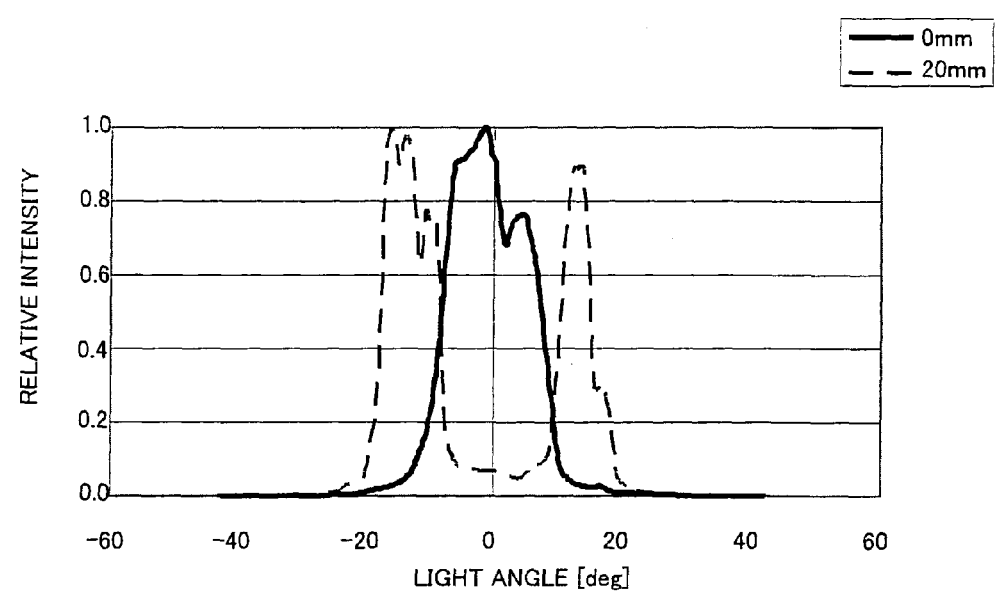
FIG. 13 is a diagram of an FFP by the distance r between the optical axis of the laser 1 and the optical axis of a focusing lens 32 in EXAMPLE 5.

This example is a variant of EXAMPLE 2. As shown in FIG. 12, the optical fiber 41 is disposed to correspond to the optical axis of the focusing lens 32, and the incident end 41a is disposed on a focal point of the focusing lens 32. On the other hand, curing light with the diameter of 7 mm from the laser 1 can be moved in parallel with the optical axis of the focusing lens 32 maintaining the parallel state. That is, the optical axis of the curing light with the diameter of 7 mm is shifted in parallel from the optical axis of the focusing lens 32 by the distance of r. The self-written optical waveguide 51 is respectively formed in a case that the distance r is 0 mm and a case that the distance r is 20 mm, and the taper angle of the self-written optical waveguide 51 at a portion 1 mm from the radiation end 41b of the optical fiber 41 is measured. Moreover, FIG. 13 shows an FFP of the radiation end 41b of the optical fiber 41 in a state that it is not irradiating the light curing resin liquid 50.

When the curing light with the diameter of 7 mm is guided along the optical axis of the focusing lens 32 (r=0 mm), the taper angle is −4.2 degrees, that is, the downtaper is shown. On the other hand, when the curing light with the diameter of 7 mm is guided parallel to the optical axis separated by 20 mm from the optical axis of the focusing lens 32 (r=20 mm), the taper angle is 4.9 degrees, that is, the uptaper is shown.

The formed taper angle of the self-written optical waveguide 51 can be adjusted from positive to negative values.

EXAMPLE 6

Figure 14:
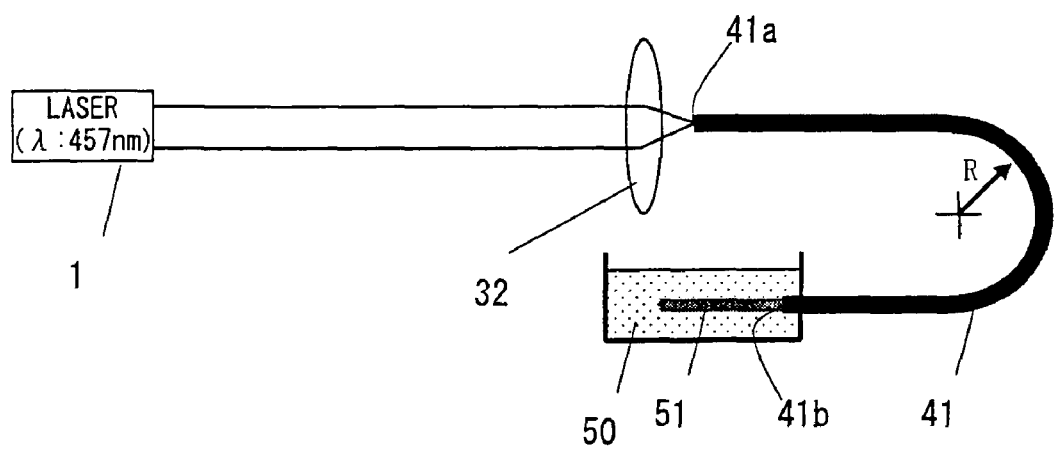
FIG. 14 is a configuration diagram of a fabrication method of the self-written optical waveguide 51 in EXAMPLE 6.
Figure 15:
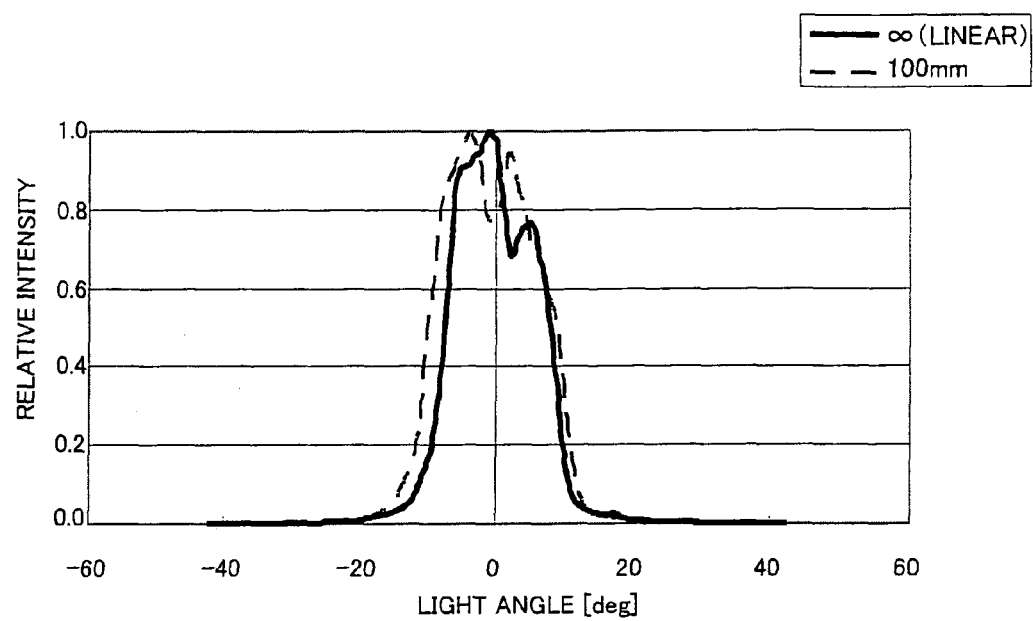
FIG. 15 is a diagram of an FFP by the radius R of a bending portion of the optical fiber 41 in EXAMPLE 6.

As shown in FIG. 14, the self-written optical waveguide 51 is respectively formed in a case that a bend in which a radius R is 100 mm and the angle is 180 degrees is applied to the optical fiber 41 and a case that the bend is not applied thereto, and the taper angle of the self-written optical waveguide 51 at a portion 1 mm from the radiation end 41b of the optical fiber 41 is measured. Moreover, FIG. 15 shows an FFP of the radiation end 41b of the optical fiber 41 in a state that it is not irradiating the light curing resin liquid 50.

When the bend is not applied to the optical fiber 41 (R=∞), the taper angle is −4.2 degrees, that is, the downtaper is shown. On the other hand, when the bend in which a radius is 100 mm and the angle is 180 degrees is applied to the optical fiber 41, the taper angle is −3.9 degrees, that is, the downtaper is shown. When the incident mode distribution to the optical fiber 41 is broadened to change the amount of bending of the optical fiber, the taper angle of self-written optical waveguide 51 can be adjusted to 0 or a positive value.

The formed taper angle of the self-written optical waveguide 51 can be adjusted from positive to negative values.

EXAMPLE 7

Figure 16:
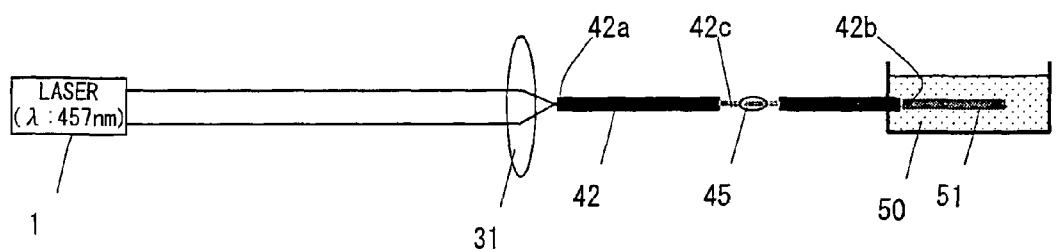
FIG. 16 is a configuration diagram of a fabrication method of the self-written optical waveguide 51 in EXAMPLE 7.
Figure 17:
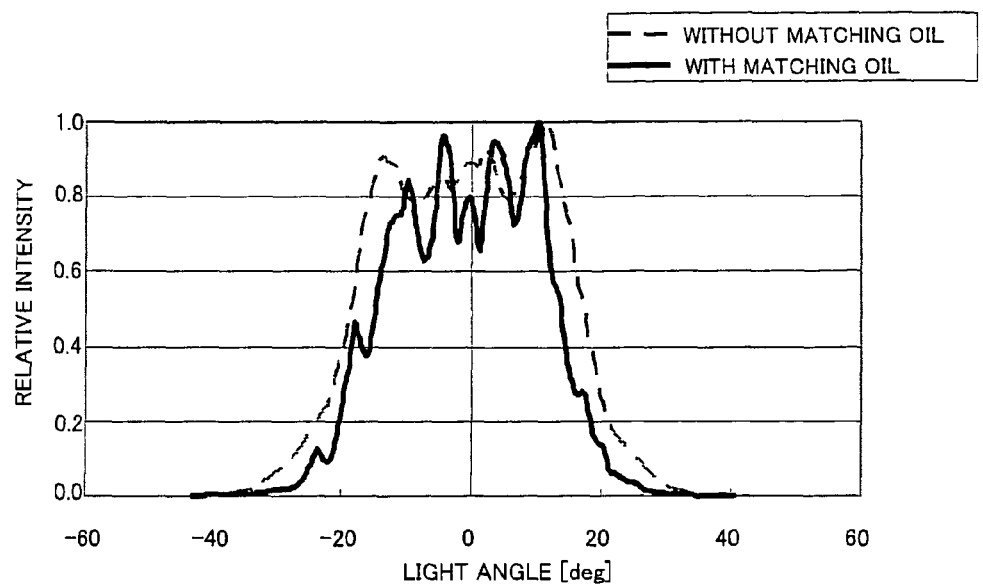
FIG. 17 is a diagram of an FFP when matching oil 45 is applied to a bare core 42c or when it is not applied thereto in EXAMPLE 7.

As shown in FIG. 16, a jacket of a middle portion of an optical fiber 42 with a length of 0.5 m (ESKA-Miu of quasi GI type manufactured by Mitsubishi Rayon Co., Ltd., NA=0.25) is peeled by about 10 mm, and cladding is removed using acetone to allow a bare core to be exposed. The self-written optical waveguide 51 is respectively formed in a case that matching oil 45 with the refractive index of 1.50 is applied to this position and a case that that matching oil 45 is not applied thereto, and the taper angle of the self-written optical waveguide 51 at a portion 1 mm from the radiation end 42b of the optical fiber 42 is measured. Moreover, FIG. 17 shows an FFP of the radiation end 42b of the optical fiber 42 in a state that it is not irradiating the light curing resin liquid 50. When the matching oil is not applied, air exits on the outside of the bear core and its refractive index is about 1.

When the bear core 42c is exposed without the matching oil 45, the taper angle is 5.5 degrees, that is, the uptaper is shown. On the other hand, when the matching oil 45 is applied on the bare core 42c, the taper angle is 2.7 degrees, that is, the uptaper is shown. However, in this case the taper angle becomes smaller. When matching oil with the high refractive index is used, the taper angle of the self-written optical waveguide 51 can be adjusted to 0 or a negative value.

The formed taper angle of the self-written optical waveguide 51 can be adjusted from positive to negative values.

OTHER VARIANTS

Figure 18:
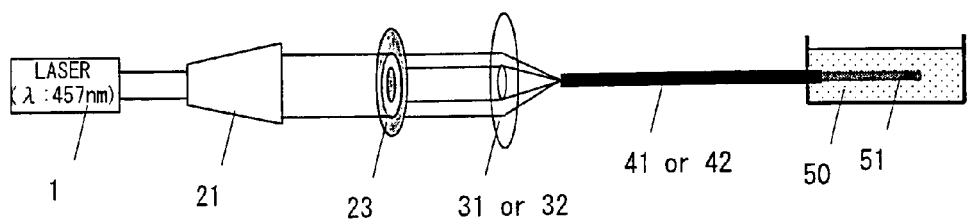
FIG. 18 is a configuration diagram of a fabrication method of the self-written optical waveguide 51 in the modification.

As shown in FIG. 18, a method of changing the incident mode distribution in accordance with the pattern of a mask 23 by disposing the mask 23 in front of the focusing lens 31 or 32 and the like can adjust the taper angle of self-written optical waveguide 51.

EXAMPLE 8

Figure 19:
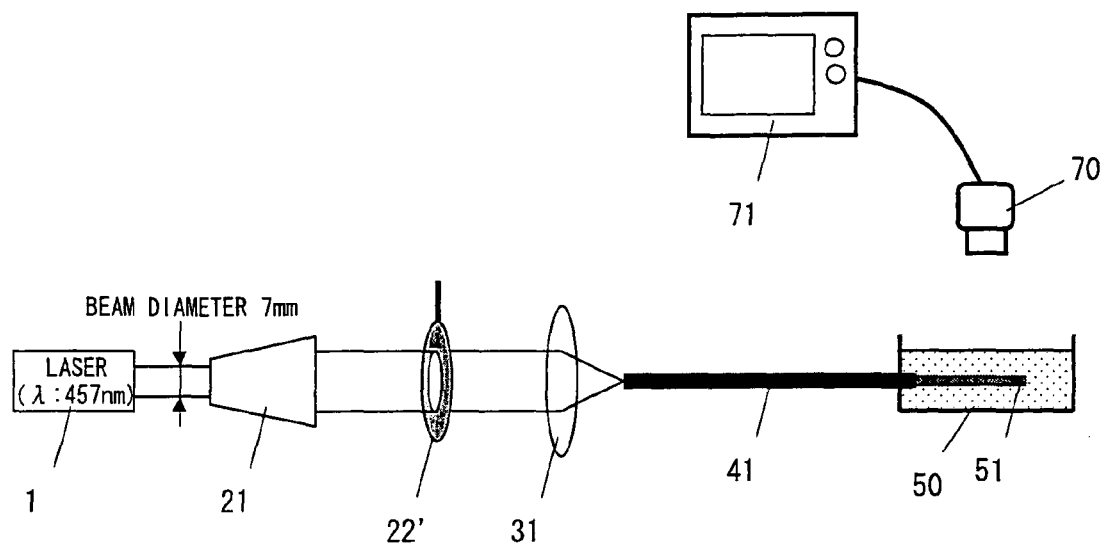
FIG. 19 is a configuration diagram of a fabrication method of the self-written optical waveguide 51 in EXAMPLE 8.

As shown in FIG. 19, the pinhole 22 of the experimental system used in FIG. 3 is replaced with an iris diaphragm 22' in which the hole diameter can be changed from 1 mm to 12 mm to take an image of the self-written optical waveguide 51 during fabrication by a CCD camera 70 (KEYENCE, CV-070). The obtained image is inputted in an image processing device 71 (KEYENCE, CV-750), and the taper angle of the self-written optical waveguide 51 can be measured by a real-time image processing. Here, as an example, when the fabrication of the self-written optical waveguide 51 is initiated in a state that the diameter of the iris diaphragm is 7 mm, the taper angle of about 2.5 degrees is measured by the image processing device 71 in accordance with the results of FIG. 5. Then, when the diameter of iris diaphragm 22' becomes not greater than 5 mm, the taper angle can be smaller. On the other hand, when the fabrication of the self-written optical waveguide 51 is initiated in a state that the diameter of the iris diaphragm is small and thereafter the diameter is allowed to be large, the taper angle can be larger. Additionally, other than the method using the iris diaphragm 22', the similar control can be executed using a method of changing the radiation pattern in each of the above examples. Moreover, the operation of each device and part can be controlled so that the radiation pattern is automatically changed in accordance with the output result of the image processing device 71. In addition, binarization is used as the image processing of the image processing device 71. However, the image processing method is not limited to these examples.

The formed taper angle of the self-written optical waveguide 51 on a desired position can be increased or decreased.

In the above examples, the self-written optical waveguide is fabricated using one kind of light curing resin liquid. However, the application of the present invention is not limited to this. The present invention is preferably applied in a case that a mixed solution of two kinds of light curing resin liquid having a different refractive index and including radical polymerization and cationic polymerization as a polymerization mechanism is used as disclosed, for example, in Japanese Unexamined Patent Application Publication No. 2002-169038 or Japanese Unexamined Patent Application Publication No. 2004-149579 filed by the applicant of the present application. Consequently, the self-written optical waveguide having a core with an improved uniformity of the diameter, or the self-written optical waveguide having a core with a desired taper on a desired position can be fabricated.

The invention claimed is:

1. A fabrication method of a self-written optical waveguide in which an optical waveguide is formed by irradiating curing light into a light curing resin liquid from an optical waveguide for introducing curing light and axially curing the light curing resin liquid in an optical axis direction, wherein a radiation pattern from the optical waveguide for said introducing curing light into the light curing resin liquid is adjustable, and a taper angle of a self-written optical waveguide to be formed is controlled in a range of from positive to negative values, and wherein a taper angle of a cured portion is measured in forming the self-written optical waveguide by using an image pickup device, the radiation pattern from the optical waveguide for said introducing curing light to the light curing resin liquid is adjusted according to the measured taper angle to control an increase or a decrease of the taper angle at a desired position of a self-written optical waveguide to be formed.

2. The fabrication method of a self-written optical waveguide according to claim 1, wherein a proportion of higher mode components of the radiation pattern from the optical waveguide for said introducing curing light into the light curing resin liquid is decreased when the taper angle is to be decreased, and a proportion of higher mode components of the radiation pattern from the optical waveguide for said introducing curing light into the light curing resin liquid is increased when the taper angle is to be increased.

3. The fabrication method of a self-written optical waveguide according to claim 1, wherein as a method of adjusting the radiation pattern from the optical waveguide for said introducing curing light into the light curing resin liquid, a beam diameter of the curing light introduced into a focusing lens is adjusted in a range smaller than a diameter of the focusing lens by an aperture mechanism when the curing light is introduced into an incident end of the optical waveguide for said introducing curing light through the focusing lens.

4. The fabrication method of a self-written optical waveguide according to claim 1, wherein as a method of adjusting the radiation pattern from the optical waveguide for said introducing curing light to the light curing resin liquid, the optical waveguide for said introducing curing light comprises an optical fiber of graded index type, and a beam diameter of the curing light introduced into a core of the optical fiber is adjusted in a range smaller than a diameter of the core by an aperture mechanism.

5. The fabrication method of a self-written optical waveguide according to claim 1, wherein as a method of adjusting the radiation pattern from the optical waveguide for said introducing curing light to the light curing resin liquid, curing lights of a plurality of systems each having a smaller diameter than a diameter of a focusing lens and being introduced into the focusing lens are prepared, the curing light enters at positions with different distances from an optical axis of the focusing lens, and at least one of an incident position and an incident light intensity of the curing light introduced into the focusing lens is adjusted when the curing light is introduced into an incident end of the optical waveguide for said introducing curing light through the focusing lens.

6. The fabrication method of a self-written optical waveguide according to claim 1, wherein as a method of adjusting the radiation pattern from the optical waveguide for said introducing curing light to the light curing resin liquid, the optical waveguide for said introducing curing light is an optical fiber of graded index type, and curing lights of a plurality of systems each having a smaller diameter than a diameter of a core of the optical fiber and being introduced into the core are prepared, the curing light enters at positions with different distances from a center axis of the core of the optical fiber, and at least one of an incident position and an incident light intensity of the curing light introduced into the cores of the optical fiber is adjusted.

7. The fabrication method of a self-written optical waveguide according to claim 1, wherein as a method of adjusting the radiation pattern from the optical waveguide for said introducing curing light into the light curing resin liquid, an incident end of the optical waveguide for said introducing curing light is adjusted on a focal point of a focusing lens or at a position on an optical axis of the focusing lens but different from the focal point when the curing light is introduced into the incident end of the optical waveguide for said introducing curing light through the focusing lens.

8. The fabrication method of a self-written optical waveguide according to claim 1, wherein as a method of adjusting a radiation pattern from the optical waveguide for said introducing curing light into the light curing resin liquid, an angle formed by an optical axis of the optical waveguide for said introducing curing light and an optical axis of a focusing lens is adjusted when the curing light is introduced into an incident end of the optical waveguide for said introducing curing light through the focusing lens.

9. The fabrication method of a self-written optical waveguide according to claim 1, wherein as a method of adjusting the radiation pattern from the optical waveguide for said introducing curing light into the light curing resin liquid, a distance of a position where the curing light passes a focusing lens from an optical axis is adjusted when the curing light is introduced into an incident end of the optical waveguide for said introducing curing light through the focusing lens.

10. The fabrication method of a self-written optical waveguide according to claim 1, wherein as a method of adjusting the radiation pattern from the optical waveguide for said introducing curing light into the light curing resin liquid, the optical waveguide for said introducing curing light comprises an optical fiber, and a bending radius of the optical fiber is adjusted.

11. A fabrication method of a self-written optical waveguide in which an optical waveguide is formed by irradiating curing light into a light curing resin liquid from an optical waveguide for introducing curing light and axially curing the light curing resin liquid in an optical axis direction, wherein a radiation pattern from the optical waveguide for said introducing curing light into the light curing resin liquid is adjustable, and a taper angle of a self-written optical waveguide to be formed is controlled in a range of from positive to negative values, and wherein as a method of adjusting the radiation pattern from the optical waveguide for said introducing curing light to the light curing resin liquid, the optical waveguide for said introducing curing light comprises an optical fiber, and in a portion other than an end surface of the optical fiber, cladding is eliminated, and a material having a different refractive index from the refractive index of the cladding is caused to contact a core.

* * * * *